US012606315B2

(12) United States Patent
Kurihara et al.

(10) Patent No.: US 12,606,315 B2
(45) Date of Patent: Apr. 21, 2026

(54) AIRCRAFT

(71) Applicant: HONDA MOTOR CO., LTD., Tokyo (JP)

(72) Inventors: Ikumi Kurihara, Wako (JP); Toshiaki Fujii, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/152,824

(22) Filed: Jan. 11, 2023

(65) Prior Publication Data

US 2023/0406528 A1 Dec. 21, 2023

(30) Foreign Application Priority Data

Jan. 13, 2022 (JP) ................................. 2022-003680

(51) Int. Cl.
  *B64D 37/28* (2006.01)
  *B64C 1/40* (2006.01)
  *B64D 37/04* (2006.01)

(52) U.S. Cl.
  CPC ................ *B64D 37/28* (2013.01); *B64C 1/40* (2013.01); *B64D 37/04* (2013.01)

(58) Field of Classification Search
  CPC .......... B64D 37/28; B64D 37/04; B64C 1/40; B64C 29/0025; Y02T 50/40
  See application file for complete search history.

(56) References Cited

U.S. PATENT DOCUMENTS

| | | | | |
|---|---|---|---|---|
| 7,357,149 B2* | 4/2008 | Howe | .................... | B64D 37/06 |
| | | | | 137/448 |
| 8,602,362 B2* | 12/2013 | Buchwald | .............. | B64D 37/24 |
| | | | | 417/54 |
| 10,610,712 B2* | 4/2020 | Jones | ..................... | B64D 37/32 |
| 2002/0027997 A1* | 3/2002 | Watanabe | ............ | G10K 11/168 |
| | | | | 381/354 |
| 2005/0178880 A1* | 8/2005 | Howe | .................... | B64D 37/04 |
| | | | | 244/10 |
| 2008/0230654 A1* | 9/2008 | Velicki | .................. | B64D 37/04 |
| | | | | 244/135 R |
| 2012/0000205 A1* | 1/2012 | Coffinberry | ............ | B64D 13/06 |
| | | | | 60/806 |
| 2014/0208943 A1* | 7/2014 | Gupta | .................... | B64D 37/32 |
| | | | | 95/146 |
| 2015/0151845 A1* | 6/2015 | Jones | ..................... | B64D 37/32 |
| | | | | 244/135 R |

(Continued)

FOREIGN PATENT DOCUMENTS

EP 4574674 A1 * 6/2025 ............. B64D 37/30

OTHER PUBLICATIONS

Kensing, Black-Box Model Development of the JAS 39 Gripen Fuel Tank Pressurization System—Intended for a Model-Based Diagnosis System, Dec. 19, 2002, Linkoping, All pages (Year: 2002).*

(Continued)

*Primary Examiner* — Alentina Xavier
(74) *Attorney, Agent, or Firm* — Rankin, Hill & Clark LLP

(57) ABSTRACT

An aircraft includes a cabin in which an occupant rides, and a driving source driven by using fuel supplied thereto, the aircraft further including a tank unit which is disposed between the cabin and the driving source and in which a plurality of fuel tanks for storing the fuel are stacked.

12 Claims, 6 Drawing Sheets

(56) References Cited

U.S. PATENT DOCUMENTS

2019/0055031 A1*  2/2019  Williams ............... B64D 37/32
2020/0115045 A1   4/2020  Mermoz et al.

OTHER PUBLICATIONS

Japanese Office Action Corresponding to JP Patent Application No. 2022-003680, dated Jul. 22, 2025, 6 pages.
Vibeke, Kensing, "Black-Box Model Development of the JAS 39 Gripen Fuel Tank Pressurization System—Intended for a Model-Based Diagnosis System", Master's thesis performed at Division of Automatic Control, Department of Electrical Engineering, Dec. 19, 2002, 115 pages.

* cited by examiner

AIRCRAFT

CROSS-REFERENCE TO RELATED APPLICATIONS

This application is based upon and claims the benefit of priority from Japanese Patent Application No. 2022-003680 filed on Jan. 13, 2022, the contents of which are incorporated herein by reference.

BACKGROUND OF THE INVENTION

Field of the Invention

The present invention relates to an aircraft.

Description of the Related Art

US 2020/0115045 A1 discloses an aircraft including an internal combustion engine, a generator and a plurality of rotors. The generator is driven by the internal combustion engine to generate electric power. The plurality of rotors are rotated by electricity generated by the generator. The plurality of rotors rotate to generate thrust or lift for flying the aircraft.

SUMMARY OF THE INVENTION

A driving source such as an internal combustion engine or a generator generates a driving sound. There is a problem in that the driving sound emitted from the driving source echoes in a cabin of the aircraft as noise.

Further, it is considered to install a soundproof wall between the driving source and the cabin as a countermeasure against the noise. However, there is a problem in that the weight of the aircraft increases by the installation of the soundproof wall.

An object of the present invention is to solve the above-mentioned problems.

According to an aspect of the present invention, there is provided an aircraft including a cabin in which an occupant rides, and a driving source configured to be driven by using fuel (FL) supplied thereto, the aircraft comprising a tank unit which is disposed between the cabin and the driving source and in which a plurality of fuel tanks each configured to store the fuel are stacked.

According to the present invention, the driving sound transmitted from the driving source to the cabin is reduced, and an increase in the weight of the aircraft due to the soundproof wall is suppressed.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

Embodiment

Figure 1:
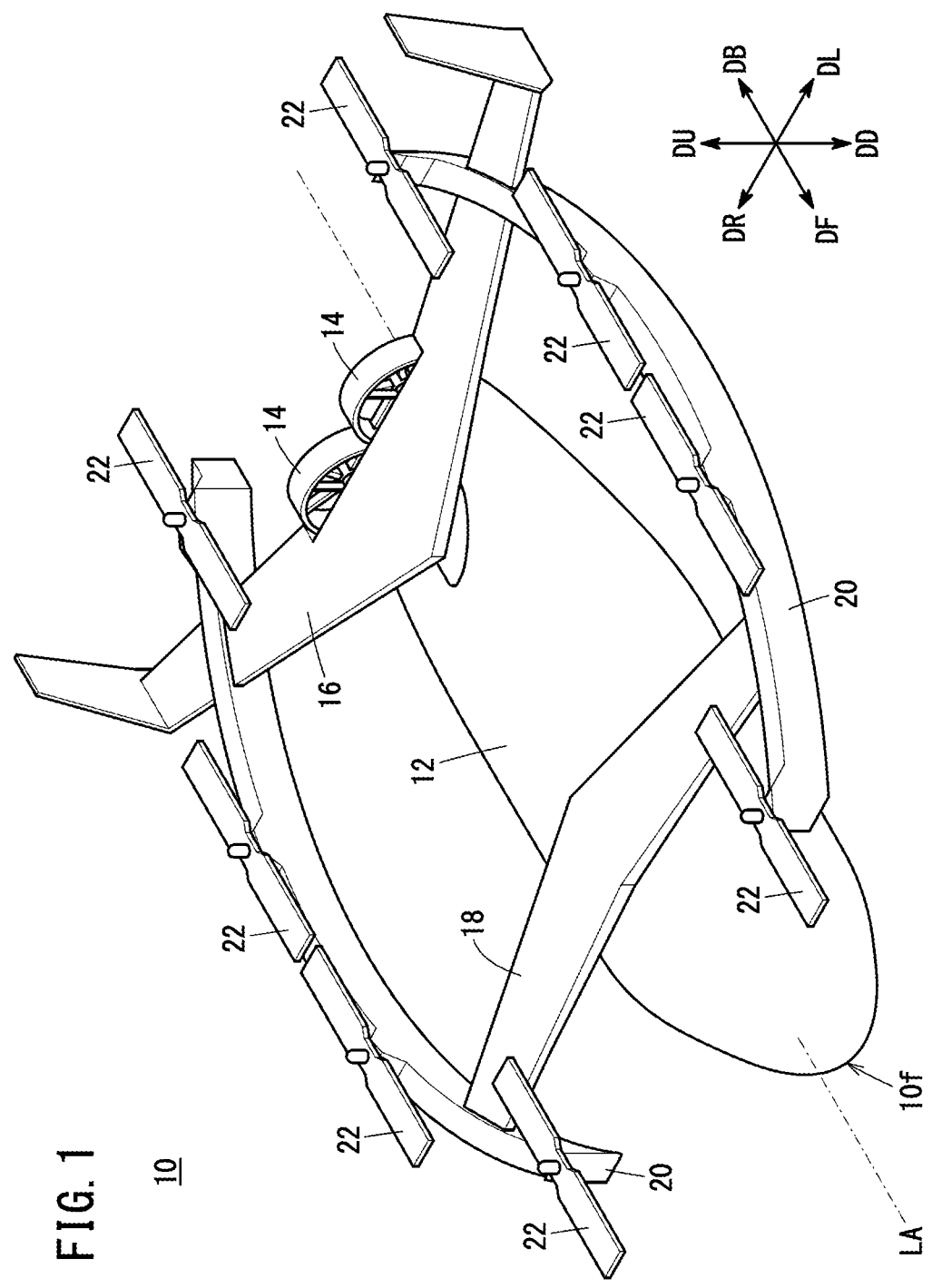
FIG. 1 is a perspective view of an aircraft according to an embodiment.

FIG. 1 is a perspective view of an aircraft 10 according to an embodiment.

In each drawing including FIG. 1, a plurality of arrows are shown. Arrow DF indicates a forward direction of the aircraft 10. Arrow DB indicates a rearward direction of the aircraft 10. Arrow DL indicates a leftward direction of the aircraft 10. Arrow DR indicates a rightward direction of the aircraft 10. Arrow DU indicates an upward direction of the aircraft 10. Arrow DD indicates a downward direction of the aircraft 10. The front-rear direction, the left-right direction, and the up-down direction are perpendicular to each other.

The aircraft 10 includes a fuselage 12, a pair of cruise rotors 14, a rear wing 16, a front wing 18, a pair of booms 20, and a plurality of takeoff and landing rotors 22.

The fuselage 12 is bilaterally symmetrical. The fuselage 12 is long in the front-rear direction. A central axis LA of the fuselage 12 extends parallel to the front-rear direction.

Each of the pair of cruise rotors 14 is a device (rotary wing) that generates thrust for propelling the aircraft 10 forward. The pair of cruise rotors 14 are installed in a rear portion of the fuselage 12 on the left and right sides of the central axis LA. The pair of cruise rotors 14 are driven by a plurality of motors. Illustration of the plurality of motors for driving the pair of cruise rotors 14 is omitted.

The rear wing 16 is a main wing installed on an upper portion of the fuselage 12. The front wing 18 is a canard wing installed on the upper portion of the fuselage 12, between the rear wing 16 and a nose 10f of the aircraft 10. The front wing 18 and the rear wing 16 generate lift by receiving wind flowing in the rearward direction.

Each of the pair of booms 20 is a member on which the plurality of takeoff and landing rotors 22 are installed. Each of the pair of booms 20 is long in the front-rear direction. The pair of booms 20 are disposed on the left and right sides of the central axis LA. The left boom 20 of the pair of booms 20 is disposed on the left side of the fuselage 12. The right boom 20 of the pair of booms 20 is disposed on the right side of the fuselage 12. Further, the pair of booms 20 are connected to the front wing 18 and the rear wing 16.

Each of the plurality of takeoff and landing rotors 22 is a device (rotary wing) that generates lift by rotating. The plurality of takeoff and landing rotors 22 are disposed as pairs on the left and right sides of the central axis LA. The plurality of takeoff and landing rotors 22 are driven by a plurality of motors. Illustration of the plurality of motors for driving the plurality of takeoff and landing rotors 22 is omitted.

Figure 2A:
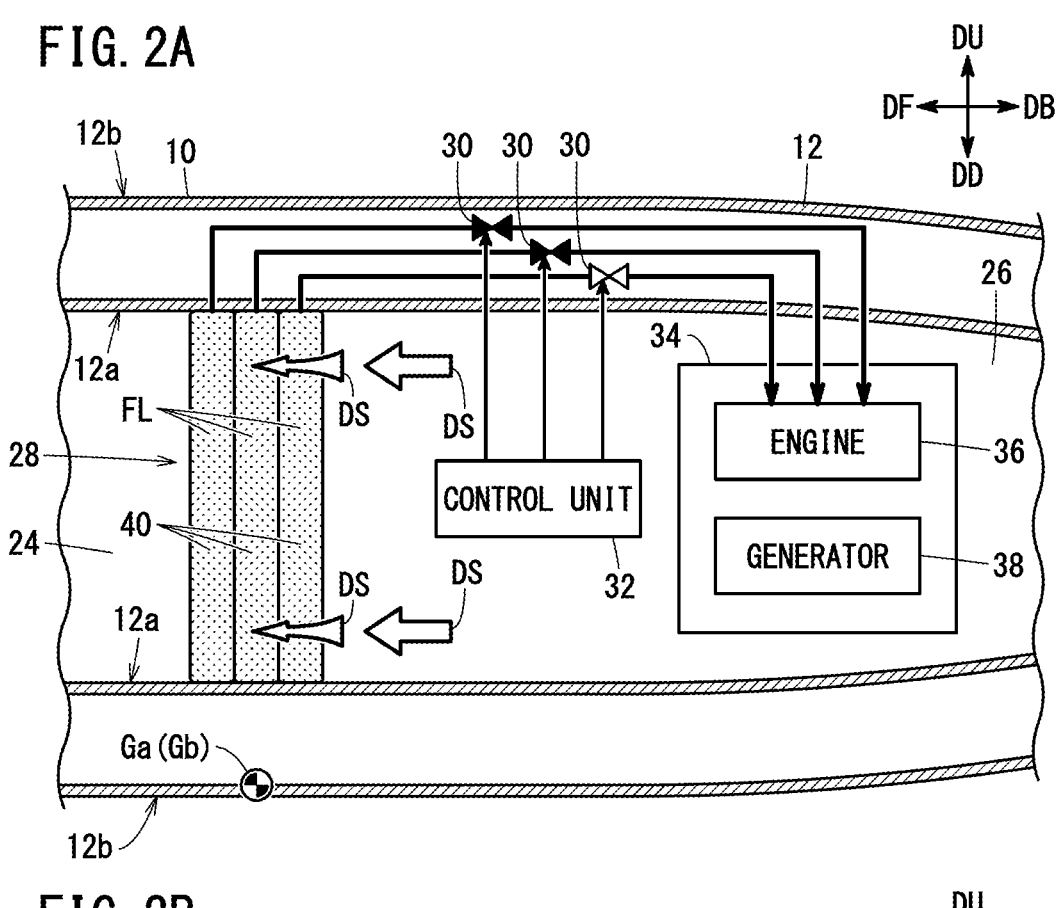
FIG. 2A is a diagram for explaining the inside of a fuselage.

FIG. 2A is a diagram for explaining the inside of the fuselage 12.

The fuselage 12 includes a front compartment (cabin) 24, a rear compartment 26, a tank unit 28, a plurality of valves 30, and a control unit (valve control unit) 32. The fuselage 12 further includes an internal wall 12a forming the interior, and an external wall 12b forming the exterior. The front compartment 24 and the rear compartment 26 are provided on the inner side of the internal wall 12a.

The front compartment 24 is a compartment in which an occupant rides. The front compartment 24 is disposed forward of the rear compartment 26. In the fuselage 12, a cockpit of the aircraft 10 is installed forward of the front compartment 24. However, illustration of the equipment in the front compartment 24 and the cockpit is omitted.

The rear compartment 26 is a compartment in which a driving source 34 is installed. A motor may be installed in the rear compartment 26. This motor is, for example, the motor for driving the cruise rotor 14.

The driving source 34 includes, for example, an engine 36 and a generator 38. The engine 36 is driven by consuming fuel FL. The generator 38 generates electric power in response to driving of the engine 36. The driving source 34 may include a battery. The battery stores the electric power generated by the generator 38. The number of each of the engine 36, the generator 38, and the battery may be one or more.

The driving source 34 supplies electric power to the equipment of the aircraft 10. For example, the driving source 34 supplies electric power to a plurality of motors for rotating the pair of cruise rotors 14.

However, the driving source 34 emits a driving sound DS by being driven. In view of this, in the present embodiment, the tank unit 28 is disposed between the front compartment 24 and the rear compartment 26 (driving source 34). The front compartment 24 and the rear compartment 26 are separated from each other by the tank unit 28 and the fuel FL stored in the tank unit 28.

The tank unit 28 is a device for storing the fuel FL. The tank unit 28 is disposed between the front compartment 24 and the rear compartment 26 to reduce the driving sound DS transmitted from the driving source 34 to the front compartment 24. In addition, the fuel FL stored in the tank unit 28 further reduces the driving sound DS transmitted from the driving source 34 to the front compartment 24.

In a case where the motor is installed in the rear compartment 26, the tank unit 28 and the fuel FL stored in the tank unit 28 also reduce the driving sound of the motor transmitted from the rear compartment 26 to the front compartment 24.

The tank unit 28 is preferably disposed above a center of gravity Ga of the aircraft 10 excluding the tank unit 28 and the fuel FL. As a result, it is possible to prevent a center of gravity Gb of the aircraft 10 including the fuel FL from being located at a position different from the center of gravity Ga in the horizontal direction.

Ga illustrated in FIG. 2A indicates the position of the center of gravity of the aircraft 10 excluding the tank unit 28 and the fuel FL in the front-rear direction. The tank unit 28 is disposed above the center of gravity Ga. The center of gravity Ga and the center of gravity Gb illustrated in FIG. 2A are at the same position in the front-rear direction (horizontal direction).

The tank unit 28 includes a plurality of fuel tanks 40. Each of the plurality of fuel tanks 40 is a tank for storing the fuel FL. The plurality of fuel tanks 40 are stacked in the front-rear direction. That is, the plurality of fuel tanks 40 are stacked in the direction in which the front compartment 24 and the rear compartment 26 are arranged side by side.

Figure 2B:
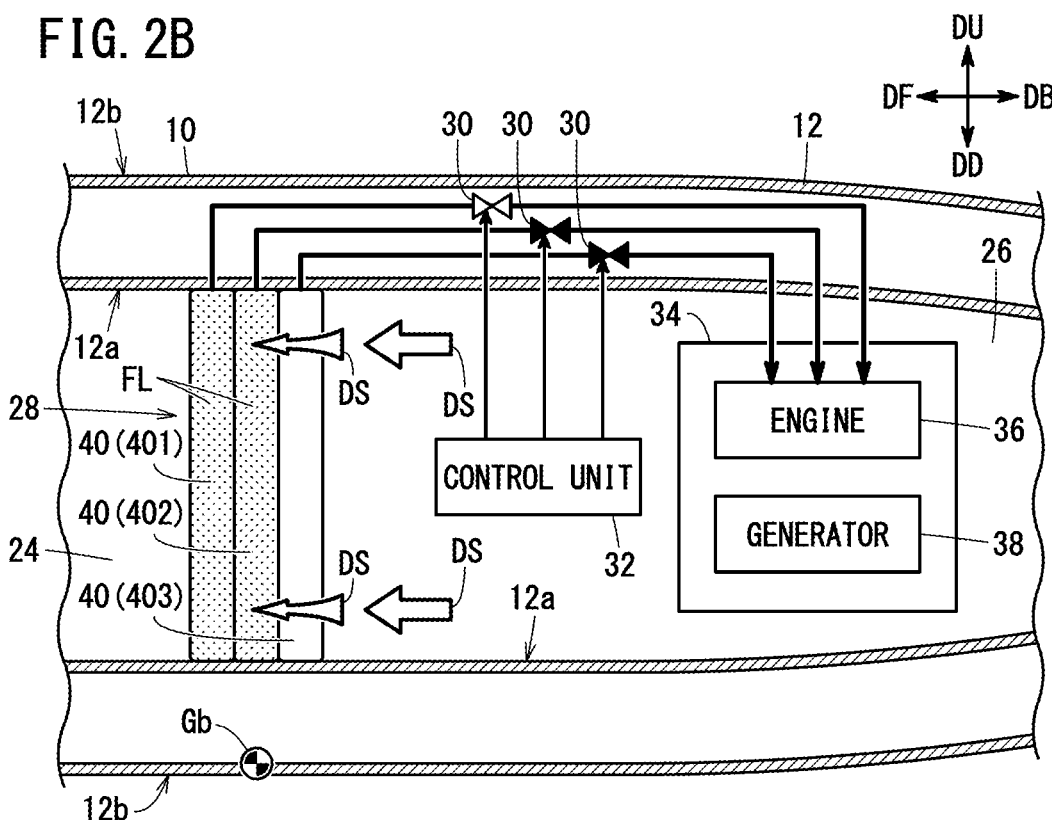
FIG. 2B is a diagram for explaining a state after a fuel tank, which is supplying a fuel to a driving source in FIG. 2A, becomes empty.

Therefore, even if one of the plurality of fuel tanks 40 becomes empty, if the fuel FL remains in at least one of the remaining fuel tanks 40, the fuel FL reduces the driving sound DS transmitted from the driving source 34 to the front compartment 24 (see also FIG. 2B). In each of FIG. 2A and FIG. 2B, the fuel FL contained in the fuel tank 40 is represented by a polka dot pattern.

The amount of the fuel FL supplied from the tank unit 28 to the driving source 34 is controlled by the plurality of valves 30 and the control unit 32. The plurality of valves 30 correspond to the plurality of fuel tanks 40, respectively. The fuel tank 40 for which the valve 30 corresponding thereto is open can supply the fuel FL to the driving source 34. On the other hand, the fuel tank 40 for which the valve 30 corresponding thereto is closed does not supply the fuel FL to the driving source 34.

Among the plurality of valves 30 illustrated in FIG. 2A, the valve 30 in white is the valve 30 in the open state (the same applies to FIG. 2B). In addition, among the plurality of valves 30 illustrated in FIG. 2A, the valves 30 in black are the valves 30 in the closed state (the same applies to FIG. 2B). Therefore, in FIG. 2A, the fuel FL is supplied to the driving source 34 only from the fuel tank 40 on the rearmost side among the three fuel tanks 40 arranged side by side in the front-rear direction. The open state and the closed state of each of the plurality of valves 30 are switched based on control performed by the control unit 32.

For the sake of illustration, the plurality of valves 30 are disposed above the plurality of fuel tanks 40 across the internal wall 12a of the fuselage 12. However, the plurality of valves 30 may be disposed on the lower side, the right side, the left side, or the like of the plurality of fuel tanks 40 across the internal wall 12a.

The control unit 32 is, for example, a computer including a processor and a memory. In this case, the function of the control unit 32 described below is realized by the processor executing a program stored in the memory. However, the function of the control unit 32 may be realized by processing circuitry such as an application specific integrated circuit (ASIC), a field-programmable gate array (FPGA), or a discrete device. The control unit 32 is installed in the rear compartment 26. However, the control unit 32 may be installed in a place other than the rear compartment 26.

The control unit 32 controls the amount of the fuel FL supplied from the tank unit 28 to the driving source 34, by controlling the opening and closing of the plurality of valves 30. The control unit 32 selects one of the plurality of valves 30, and opens the selected valve 30. The fuel FL in the fuel tank 40 corresponding to the opened valve 30 is supplied to the driving source 34.

FIG. 2B is a diagram for explaining a state after the fuel tank 40, which is supplying the fuel FL to the driving source 34 in FIG. 2A, becomes empty.

After one fuel tank 40 becomes empty, the control unit 32 opens the valve 30 corresponding to another one of the fuel tanks 40 in which the fuel FL remains. As a result, a state in which at least one of the plurality of fuel tanks 40 is fully filled with the fuel FL can be maintained for as long as possible. By maintaining the state in which at least one of the fuel tanks 40 is fully filled with the fuel FL for as long as possible, the soundproof effect by the fuel FL can be maintained for as long as possible.

The remaining amount of the fuel FL in each of the plurality of fuel tanks 40 is detected based on a detection signal of a predetermined sensor that detects, for example, the remaining amount of the fuel FL in the fuel tank 40 or the position of the liquid level in the fuel tank 40. In addition, the control unit 32 may close the valve 30 corresponding to the fuel tank 40 that has become empty.

The control unit 32 may select the valve 30 to be opened randomly or in accordance with a predetermined order. However, in any case, the control unit 32 selects the valve 30 corresponding to the fuel tank 40 in which the fuel FL remains. For example, three fuel tanks 40 (401, 402, and 403) are illustrated in FIG. 2B. Among the three fuel tanks 40, the fuel tank 403 disposed on the rearmost side is empty. In this case, the control unit 32 opens the valve 30 corresponding to the fuel tank 401 disposed on the foremost side or the fuel tank 402 disposed in the middle.

The predetermined order is an order in which the valve 30 corresponding to the fuel tank 40 that contains the fuel FL and is located farther from the center of gravity Gb of the aircraft 10 than the other fuel tanks 40 is opened first. For example, in FIG. 2B, the fuel FL remains in the fuel tank 401 and the fuel tank 402. However, among the fuel tank 401 and the fuel tank 402, the fuel tank 401 is disposed at a position farther from the center of gravity Gb than the fuel tank 402. In this case, the control unit 32 opens the valve 30 corresponding to the fuel tank 401. Note that, when there are two fuel tanks 40 whose distances from the center of gravity Gb are the same, the valve 30 corresponding to either of the two fuel tanks 40 may be selected.

By supplying the fuel FL to the driving source 34 first from the fuel tank 40 located farther from the center of gravity Gb, the fluctuation of the position of the center of gravity Gb caused by the supply of the fuel FL is suppressed.

The control unit 32 may select the valve 30 to be opened in accordance with an order other than the order in which the valve 30 corresponding to the fuel tank 40 that contains the fuel FL and is located farther from the center of gravity Gb of the aircraft 10 than the other fuel tanks 40 is opened first.

The aircraft 10 according to the present embodiment has been described above. The tank unit 28 can be applied to general aircrafts using the fuel FL and including the front compartment 24 and the driving source 34.

[Modification]

Modifications of the above-described embodiment will be described below. However, description overlapping with that of the above-described embodiment will be omitted as much as possible in the following description. Constituent elements that have already been described in the above-described embodiment are denoted by the same reference numerals as those in the above-described embodiment unless otherwise indicated.

(Modification 1)

Figure 3:
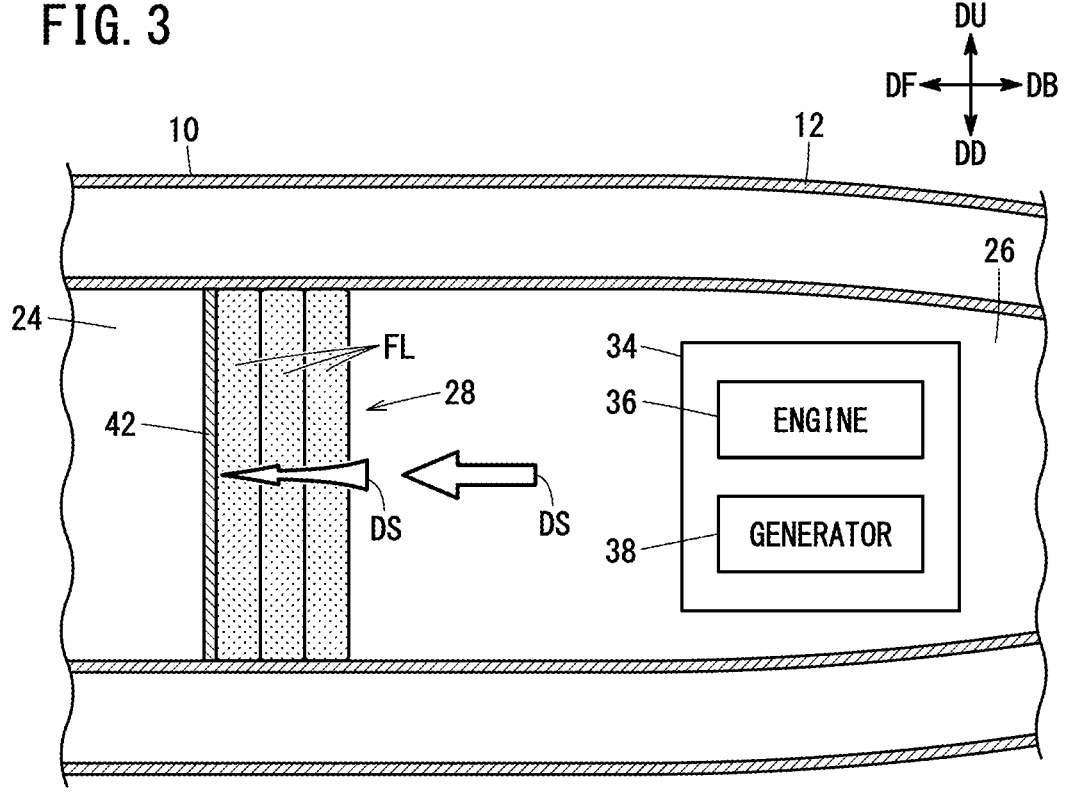
FIG. 3 is a diagram for explaining the inside of the fuselage according to a first modification.

FIG. 3 is a diagram for explaining the inside of the fuselage 12 according to a first modification. In order to simplify the illustration, the plurality of valves 30 and the control unit 32 are not illustrated.

The aircraft 10 may further include a soundproof wall 42 installed between the front compartment 24 and the tank unit 28. The soundproof wall 42 reduces the driving sound DS that has passed through the tank unit 28 (the fuel FL).

Before reaching the soundproof wall 42, the driving sound DS is reduced by the fuel FL in the tank unit 28. Therefore, the thickness of the soundproof wall 42 in the front-rear direction can be minimized. As a result, the weight of the soundproof wall 42 can be minimized. According to the present modification, it is possible to further reduce the transmission of the driving sound DS to the front compartment 24 while minimizing the increase in the weight of the aircraft 10 due to the addition of the soundproof wall.

(Modification 2)

Figure 4:
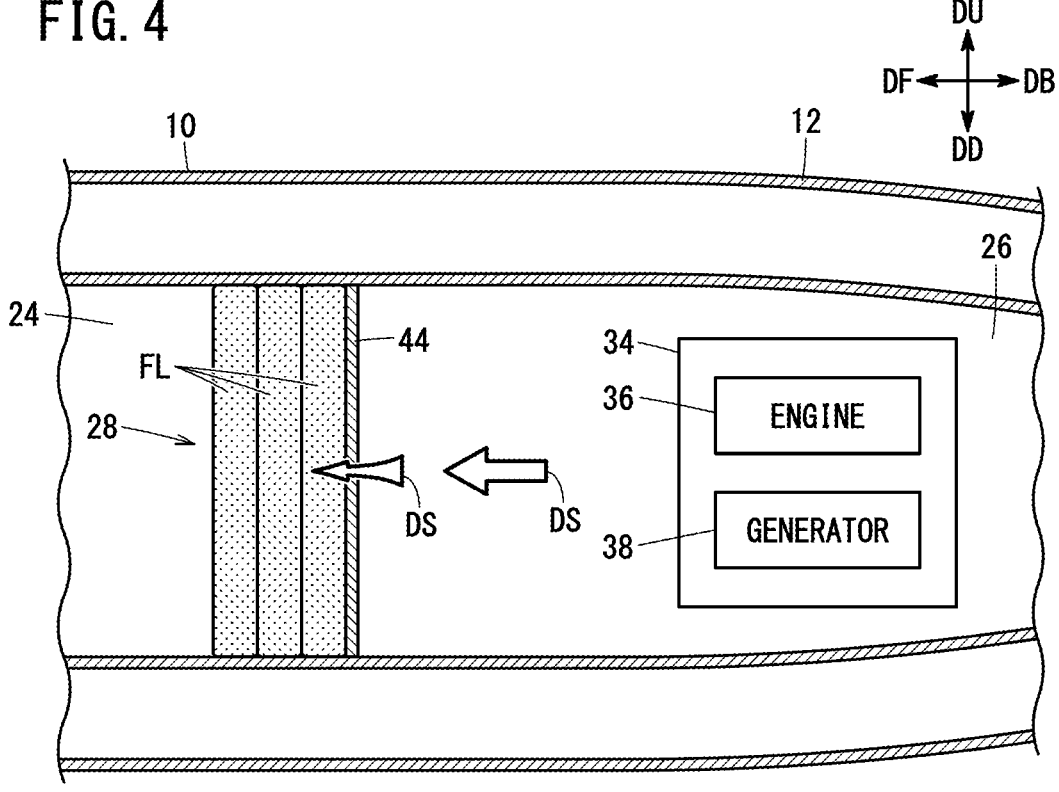
FIG. 4 is a diagram for explaining the inside of the fuselage according to a second modification.

FIG. 4 is a diagram for explaining the inside of the fuselage 12 according to a second modification. In order to simplify the illustration, the plurality of valves 30 and the control unit 32 are not illustrated.

The aircraft 10 may further include a soundproof wall 44 installed between the tank unit 28 and the driving source 34. The soundproof wall 44 reduces the driving sound DS transmitted to the tank unit 28 (the fuel FL).

The driving sound DS is reduced not only by the soundproof wall 44 but also by the fuel FL in the tank unit 28. Therefore, the thickness of the soundproof wall 44 in the front-rear direction can be minimized. As a result, the weight of the soundproof wall 44 can be minimized. According to the present modification, it is possible to further reduce the transmission of the driving sound DS to the front compartment 24 while minimizing the increase in the weight of the aircraft 10 due to the addition of the soundproof wall.

(Modification 3)

Figure 5:
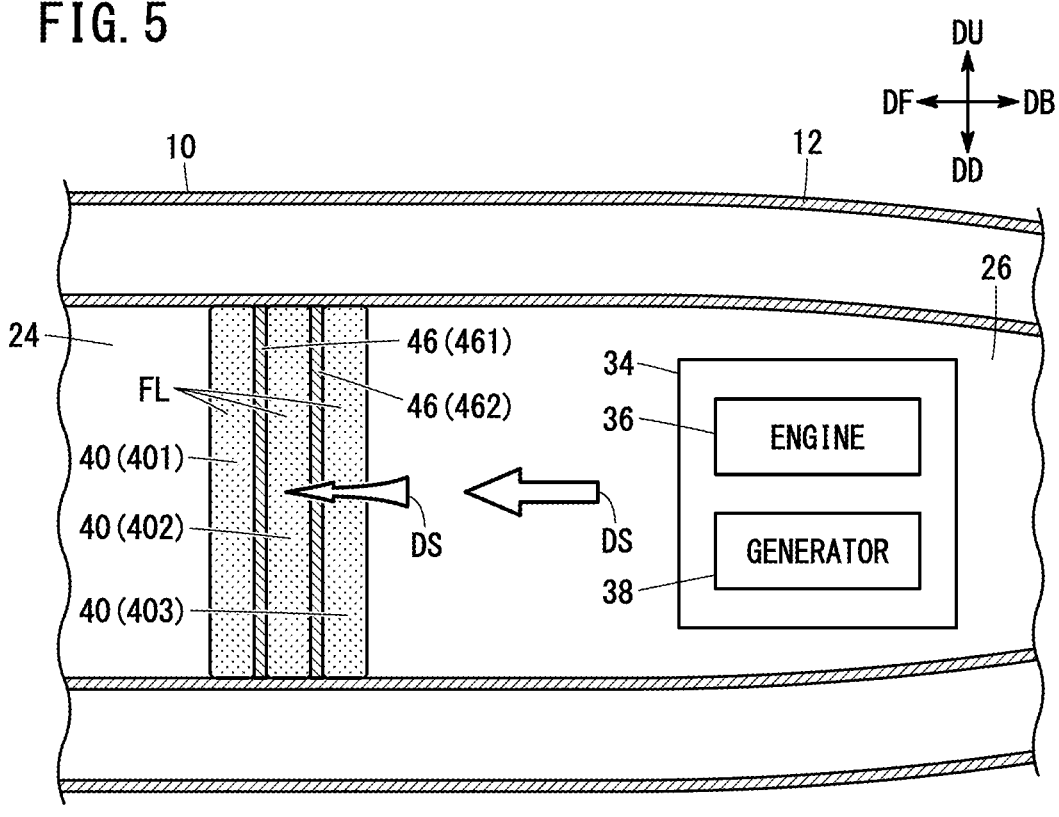
FIG. 5 is a diagram for explaining the inside of the fuselage according to a third modification.

FIG. 5 is a diagram for explaining the inside of the fuselage 12 according to a third modification. In order to simplify the illustration, the plurality of valves 30 and the control unit 32 are not illustrated.

The aircraft 10 may further include a soundproof wall 46 disposed between two adjacent fuel tanks 40. The soundproof wall 46 reduces the driving sound DS transmitted between the two adjacent fuel tanks 40.

Before reaching the soundproof wall 46, the driving sound DS is reduced by the fuel FL in the fuel tank 40 disposed rearward of the soundproof wall 46. The driving sound DS is also reduced by the fuel FL in the fuel tank 40 disposed forward of the soundproof wall 46. Therefore, the thickness of the soundproof wall 46 in the front-rear direction can be minimized. As a result, the weight of the soundproof wall 46 can be minimized. According to the present modification, it is possible to further reduce the transmission of the driving sound DS to the front compartment 24 while minimizing the increase in the weight of the aircraft 10 due to the addition of the soundproof wall.

In FIG. 5, two soundproof walls 46 (461 and 462) are illustrated. The soundproof wall 461 is the soundproof wall 46 disposed between the fuel tank 401 and the fuel tank 402. The soundproof wall 462 is the soundproof wall 46 disposed between the fuel tank 402 and the fuel tank 403. In this manner, in a case where the number of the fuel tanks 40 is three or more, the aircraft 10 may include a plurality of the soundproof walls 46. On the other hand, for example, one of the soundproof wall 461 or the soundproof wall 462 may be omitted as necessary.

(Modification 4)

Figure 6A:
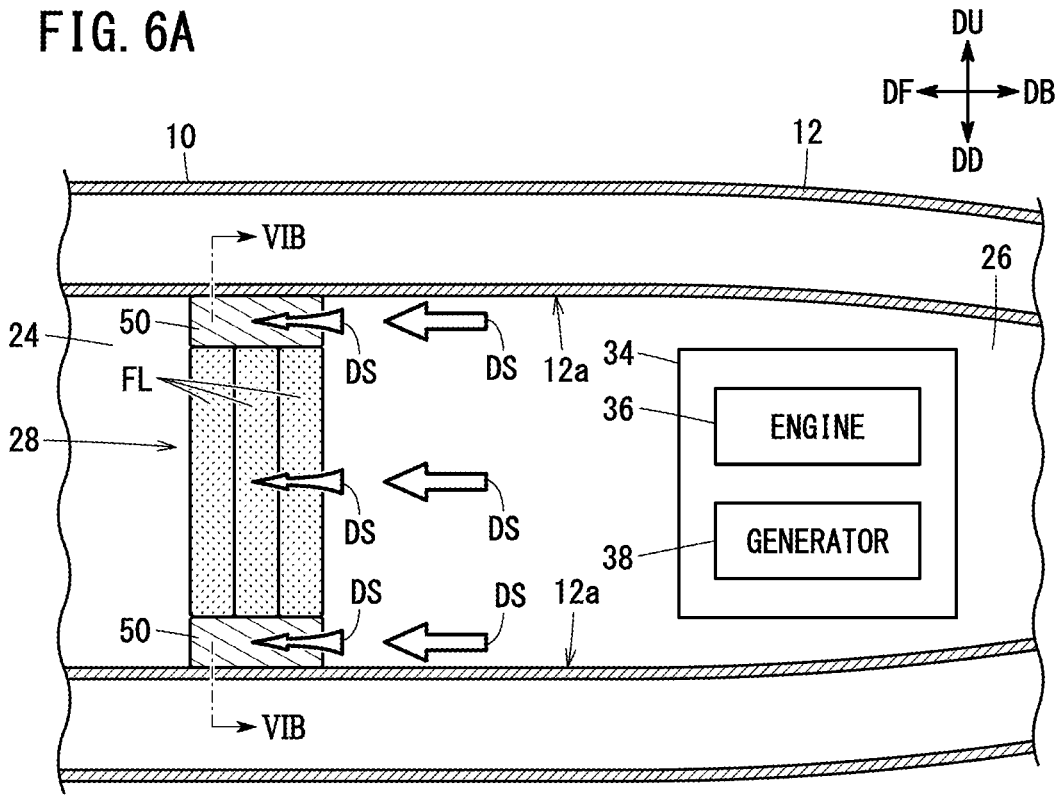
FIG. 6A is a diagram for explaining the inside of the fuselage according to a fourth modification.
Figure 6B:
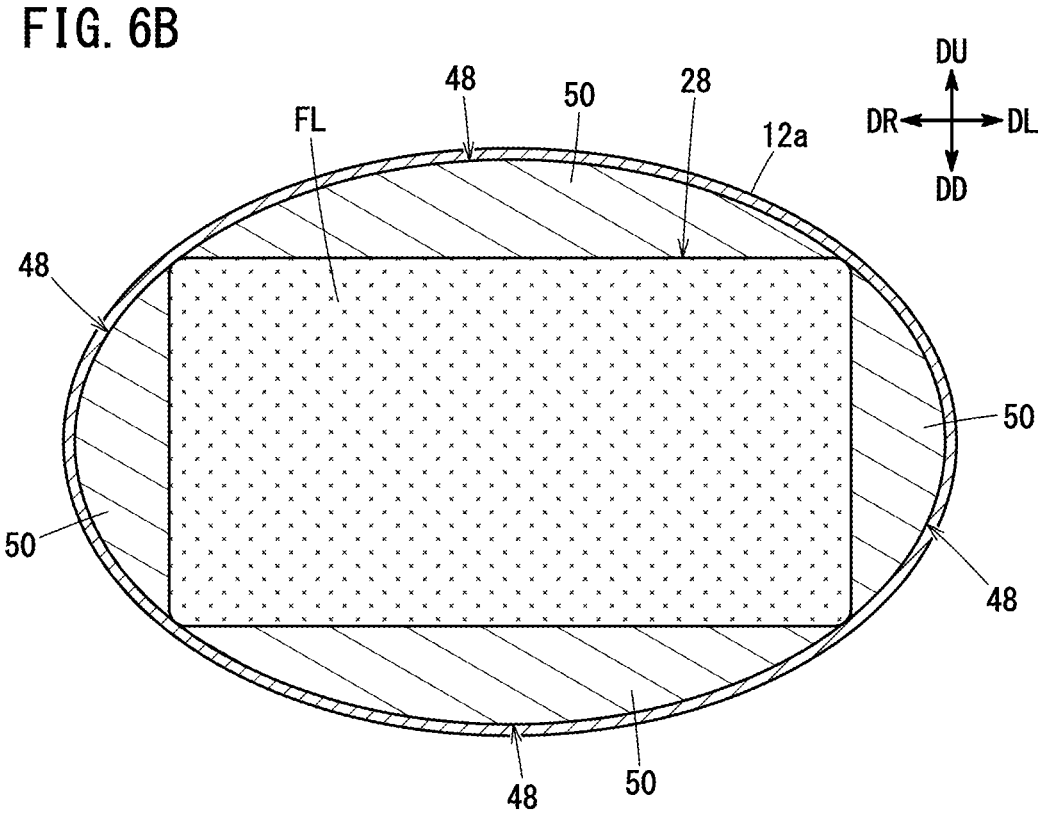
FIG. 6B is an end view taken along line VIB-VIB of FIG. 6A.

FIG. 6A is a diagram for explaining the inside of the fuselage 12 according to a fourth modification. FIG. 6B is an end view taken along line VIB-VIB of FIG. 6A. In order to simplify the illustration, the plurality of valves 30 and the control unit 32 are not illustrated.

There is a case where a clearance 48, which allows the front compartment 24 and the driving source 34 to communicate with each other, is formed between the tank unit 28 and the internal wall 12a of the fuselage 12. For example, the cross-section of the tank unit 28 illustrated in FIG. 6B has a rectangular shape. On the other hand, the internal wall 12a illustrated in FIG. 6B has a cylindrical (elliptical) shape. In this case, the clearance 48 is formed between the tank unit 28 and the internal wall 12a.

The driving sound DS of the driving source 34 may be transmitted to the front compartment 24 through the clearance 48. In view of this, the aircraft 10 may further include a soundproof wall 50. The soundproof wall 50 is provided between the tank unit 28 and the internal wall 12a so as to fill the clearance 48. The soundproof wall 50 reduces the driving sound DS that is transmitted through the clearance 48 to the front compartment 24.

The soundproof wall 50 preferably has a sufficient thickness in the front-rear direction in order to reduce the driving sound DS transmitted through the clearance 48. However, the area of the soundproof wall 50 in the up-down and left-right directions can be a minimum area to fill the clearance 48. Therefore, the weight of the soundproof wall 50 can be minimized. According to the present modification, it is possible to further reduce the transmission of the driving sound DS to the front compartment 24 while minimizing the increase in the weight of the aircraft 10 due to the addition of the soundproof wall.

The soundproof wall 50 is connected to the tank unit 28. The method for connecting the soundproof wall 50 to the tank unit 28 is, for example, screwing. However, the method for connecting the soundproof wall 50 to the tank unit 28 is not limited to screwing. The soundproof wall 50 may be bonded to the tank unit 28 by an adhesive. Further, the soundproof wall 50 may be formed integrally with the tank unit 28.

(Modification 5)

A power control unit for controlling each of the above-described motors and a power drive system may be installed in the rear compartment 26.

(Combination of Plurality of Modifications)

The plurality of modifications described above may be appropriately combined within a range in which no contradiction occurs.

Invention Obtained from Embodiment

Hereinafter, the invention that can be grasped from the above-described embodiment and modifications will be described.

The aircraft (10) including the cabin (24) in which the occupant rides, and the driving source (34) configured to be driven by using the fuel (FL) supplied thereto includes the tank unit (28) which is disposed between the cabin and the driving source and in which the plurality of fuel tanks (40) each configured to store the fuel are stacked.

As a result, not only the driving sound transmitted from the driving source to the cabin is reduced, but also an increase in the weight of the aircraft due to the soundproof wall is suppressed.

The plurality of fuel tanks may be stacked in the direction in which the cabin and the driving source are arranged side by side. As a result, if the fuel remains in at least one of the plurality of fuel tanks, the fuel reduces the driving sound transmitted from the driving source to the cabin.

The aircraft may further include the plurality of valves (30) provided corresponding to the plurality of fuel tanks, respectively, and the valve control unit (32) configured to control the amount of the fuel supplied from the tank unit to the driving source by controlling opening and closing of the plurality of valves, and when one of the fuel tanks becomes empty, the valve control unit may cause the fuel in another one of the fuel tanks to be supplied to the driving source. As a result, a state in which the driving sound transmitted to the cabin is reduced by the fuel in at least one fuel tank is maintained for as long as possible.

The valve control unit may select, in accordance with a predetermined order, a fuel tank to supply the fuel to the driving source from among the fuel tanks, and cause the fuel in the fuel tank that has been selected to be supplied to the driving source. As a result, the displacement of the center of gravity according to the decrease in the fuel can be predicted based on the predetermined order.

The predetermined order may be determined in a manner so that the fuel is supplied to the driving source first from a fuel tank among the fuel tanks that is located farther from the center of gravity (Gb) of the aircraft including the fuel than the other of the fuel tanks. As a result, the center of gravity of the aircraft during flight is stabilized.

The tank unit may be disposed above the center of gravity (Ga) of the aircraft excluding the tank unit and the fuel. As a result, the center of gravity of the aircraft during flight is stabilized.

The aircraft may further include the first soundproof wall (42) installed between the cabin and the tank unit. As a result, the driving sound that has passed through the tank unit (the fuel) is reduced by the first soundproof wall.

The aircraft may further include the second soundproof wall (44) installed between the tank unit and the driving source. As a result, the driving sound transmitted from the driving source to the tank unit (the fuel) is reduced by the second soundproof wall.

The aircraft may further include the third soundproof wall (46) disposed between two fuel tanks adjacent to each other. As a result, the driving sound passing through the tank unit is reduced by the third soundproof wall.

The cabin, the driving source, and the tank unit may be provided inside the fuselage (12) of the aircraft, and the aircraft may further include the fourth soundproof wall (50) configured to fill the clearance (48) that is formed between the tank unit and the internal wall (12a) of the fuselage and that allows the cabin and the driving source to communicate with each other. As a result, the driving sound transmitted to the cabin through the clearance is reduced by the fourth soundproof wall.

The present invention is not limited to the above disclosure, and various modifications are possible without departing from the essence and gist of the present invention.

The invention claimed is:

1. An aircraft comprising:
   a front compartment which is a cabin in which an occupant rides;
   a rear compartment in which a driving source configured to be driven by using fuel supplied thereto is provided; and
   a tank unit which includes a plurality of fuel tanks arranged in a front-rear direction and each configured to store the fuel and which separates the front compartment and the rear compartment,
   wherein the plurality of fuel tanks are independent from each other in a manner so that fuel in each of the plurality of fuel tanks cannot be transferred to another fuel tank.

2. The aircraft according to claim 1, further comprising:
   a plurality of valves provided corresponding to the plurality of fuel tanks, respectively; and
   a valve control unit configured to control an amount of the fuel supplied from the tank unit to the driving source, by controlling opening and closing of the plurality of valves,
   wherein when one of the plurality of fuel tanks becomes empty, the valve control unit causes the fuel in another one of the plurality of fuel tanks to be supplied to the driving source.

3. The aircraft according to claim 2, wherein
   the valve control unit selects, in accordance with a predetermined order, a fuel tank to supply the fuel to the driving source from among the plurality of fuel tanks, and causes the fuel in the fuel tank that has been selected to be supplied to the driving source.

4. The aircraft according to claim 3, wherein the predetermined order is determined in a manner so that the fuel is supplied to the driving source first from a fuel tank among the plurality of fuel tanks that is located farther from a center of gravity of the aircraft including the fuel than other of the plurality of fuel tanks.

5. The aircraft according to claim 1, wherein the tank unit is disposed above a center of gravity of the aircraft excluding the tank unit and the fuel.

6. The aircraft according to claim 1, further comprising a first soundproof wall installed between the cabin and the tank unit.

7. The aircraft according to claim 1, further comprising a second soundproof wall installed between the tank unit and the driving source.

8. The aircraft according to claim 1, further comprising a third soundproof wall installed between two of the fuel tanks that are adjacent to each other.

9. The aircraft according to claim 1, wherein the cabin, the driving source, and the tank unit are provided inside a fuselage of the aircraft, and the aircraft further comprises a fourth soundproof wall configured to fill a clearance that is formed between the tank unit and an internal wall of the fuselage and that allows the cabin and the driving source to communicate with each other.

10. An aircraft comprising:
a front compartment which is a cabin;
a rear compartment in which a driving source configured to be driven by using fuel supplied thereto is provided; and
a tank unit which includes a plurality of fuel tanks arranged in a front-rear direction and each configured to store the fuel and which separates the front compartment and the rear compartment,
wherein the plurality of fuel tanks are independent from each other in a manner so that fuel in each of the plurality of fuel tanks cannot be transferred to another fuel tank.

11. An aircraft comprising:
a front compartment which is a cabin in which an occupant rides;
a rear compartment in which a driving source configured to be driven by using fuel supplied thereto is provided;
a tank unit which includes a plurality of fuel tanks arranged in a front-rear direction and each configured to store the fuel and which separates the front compartment and the rear compartment; and
a plurality of valves provided corresponding to the plurality of fuel tanks, respectively, and placed between the corresponding fuel tank and the driving source,
wherein in a case where one of the plurality of valves is opened, at least one of the remaining valves is closed.

12. The aircraft according to claim 11, wherein in a case where one of the plurality of valves is opened, the remaining valves are closed.

* * * * *